Dec. 23, 1969  K. LINZENKIRCHNER  3,485,444
FAN AND CLUTCH WITH BAYONET JOINT DRIVE
Filed June 21, 1968
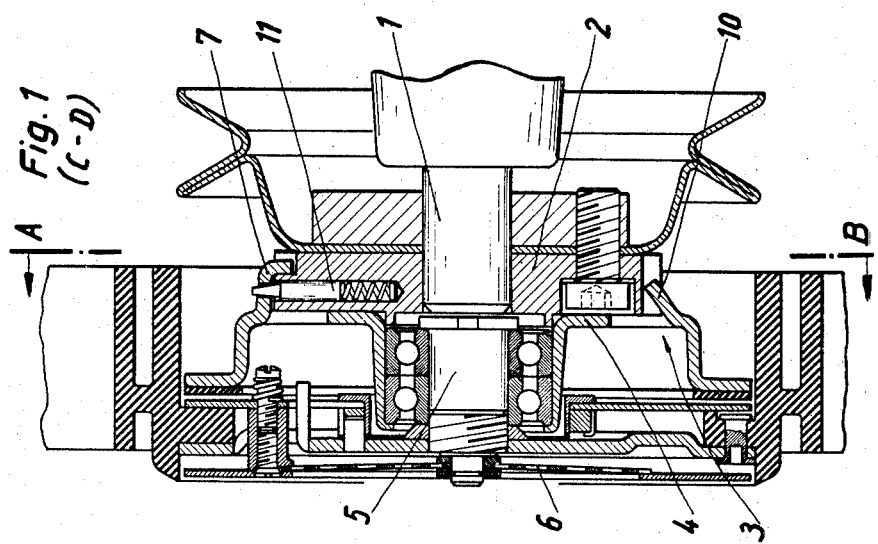
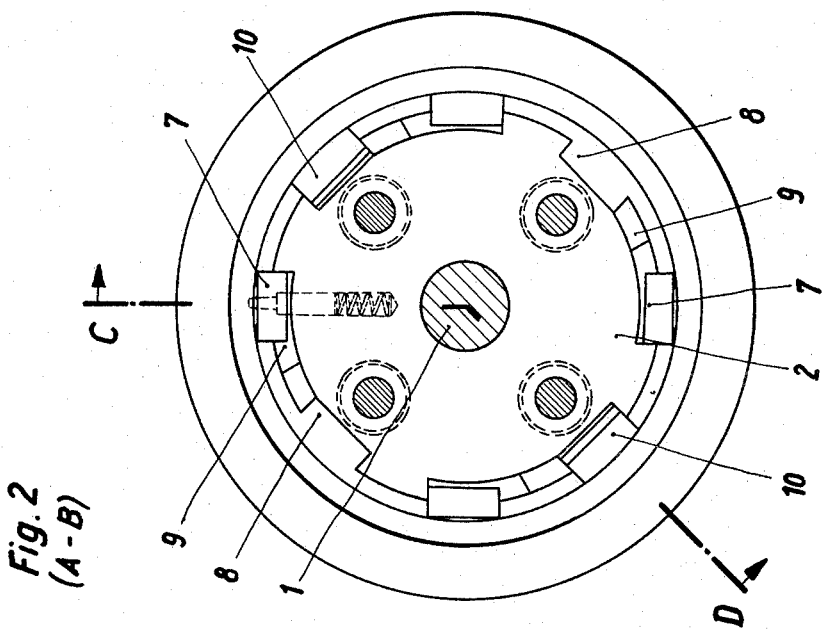
Inventor:
KARL LINZENKIRCHNER,
BY: Jacobi & Davidson
ATTORNEYS.

United States Patent Office 3,485,444
Patented Dec. 23, 1969

3,485,444
FAN AND CLUTCH WITH BAYONET JOINT DRIVE
Karl Linzenkirchner, Ingolstadt, Germany, assignor to Firma Faun Kommunalfahrzeuge und Lastkraftwagen Karl Schmidt, Nuremberg, Germany, a corporation of Germany
Filed June 21, 1968, Ser. No. 739,041
Claims priority, application Germany, July 5, 1967, 1,576,375
Int. Cl. F04d *27/00;* F16d *19/00, 13/58*
U.S. Cl. 230—271   3 Claims

ABSTRACT OF THE DISCLOSURE

An IC engine cooling fan assembly of the type using a snap-action bimetallic disc for operating a fan clutch. In order to facilitate the connection and removal of the fan and clutch to a drive shaft, they are arranged to be connected to the drive shaft by means of a bayonet joint.

---

The present invention relates to cooling fan assemblies and more particularly to such assemblies of the type comprising a centrally arranged bimetallic disc for operating a clutch for driving the fan, the disc being mounted at the front end of the drive shaft of a motor vehicle IC engine. Usually such fan clutches are held in position by a number of screws fitted into tapped holes in a hub keyed onto the drive shaft of the IC engine, that is to say the shaft for driving the fan. Such a manner of attachment however involves complications in assembly since it is undesirable that holes should be provided in the disc for the access of tools from the front side of the fan for turning the screws or bolts. As a result the screws have to be arranged so as to be accessible from the other side of the fan but this is a requirement which is not easy to fulfill.

One object of the invention, therefore, is to provide an IC engine cooling fan assembly which is simple to fit and therefore is cheap.

The present invention consists in an IC engine cooling fan assembly comprising a cooling fan, a drive shaft, the fan being arranged to rotate about the same axis as the shaft, a clutch for driving the fan, a temperature-responsive disc for operating the clutch, the disc being generally perpendicular to the axis of fan rotation, a base plate forming part of the fan, the base plate having approximately radially extending tags, and a hub fixed to the shaft, the hub having means for cooperating with the tags in the manner of a bayonet joint coupled up by relative rotation between the hub and the base about the shaft axis.

In one form of the invention a flexible tab on the base plate is provided bent into a recess in the hub for preventing rotation between the hub and the base plate.

Alternatively, if it is desired that it should be easy to detach the fan from the hub, a generally radial spring loaded pin can be arranged in the hub so as to extend into a recess in plate for preventing rotation between hub and the base plate, the pin being capable of being pressed back into the hub for allowing such relative rotation.

When the bayonet joint is screwed up the pin automatically springs into the recess in the plate for locking the bayonet joint.

The invention is now described, by way of example, with reference to the accompanying drawing.

FIGURE 1 is an axial section on the line C-D of FIGURE 2 through a cooling fan assembly amounted on a shaft of an IC engine.

FIGURE 2 is a partial section on the line A-B of FIGURE 1.

On the front end of a drive shaft 1 belonging to an IC engine, not shown, a hub or disc 2 is fixed and on this hub a fan clutch 3 is fixed in such a manner that it can be detached. The clutch comprises a base plate 4 of sheet metal on which the further parts of the clutch are mounted. The precise construction of the fan clutch is not important for the invention and it is therefore not described in detail. The clutch includes a central pin 5 on whose front end a bimetallic disc 6 is mounted. This disc serves for operating the clutch in accordance with the temperature of the air flow passing through the radiator. The bimetallic disc is not provided with any large holes which could be used for the operation of screws for attaching the plate 4 to the hub 2 and could be said to close off the clutch to the front.

On the base plate 4 there are tags 7 which are directed towards the engine and are then bent round into recesses 8 with faces 9 acting as inclined planes so that the tags 7 cooperate with the recesses and faces 9 to form a bayonet joint which connects the clutch and fan with the hub 2 to form a single unit.

For fixing the fan and coupling in position the hub 2 is to turned that the tags 7 pass through into the slots 8 so that on turning the clutch the tags come into the position shown in FIGURE 2. This manner of fitting the clutch and fan is simple and time-saving.

The drawings show two possible methods of locking the male and female parts of the bayonet joint against relative rotation. In accordance with one method the base plate 4 is provided at positions between the tags 7 with projecting tabs 10 which are so arranged that when the bayonet joint is coupled up they extend into the recesses or slots 8 so that on applying an inwardly directed force they can be bent into the position shown in the bottom half of FIGURE 1. By bending the tabs into the corresponding recesses the plate 4 is prevented from rotating in relation to the disc or hub 2.

Another form of attachment consists in the use of a spring loaded radial pin 11 mounted in a hole in the hub 2 so that it snaps into a recess in one of the tags 7 and the tapering tip portion, as can be seen in FIGURE 1, makes a firm joint in the hole in the tag 7. This form of locking means can be released by applying a pointed tool so as to press pin 11 down under the tag 7 and unscrewing of the plate on the hub 2 is made possible.

I claim:
1. An IC engine cooling fan assembly comprising a cooling fan, a drive shaft, the fan being arranged to rotate about the same axis as the shaft, a clutch for driving the fan, a temperature-responsive disc for operating the clutch, the disc being generally perpendicular to the axis of fan rotation, a base plate forming part of the clutch, the base plate having approximately radially extending tags, and a hub fixed to the shaft, the hub having means for co- operating with the tags in the manner of a bayonet joint coupled up by relative rotation between the hub and the plate about the shaft axis.

2. An assembly according to claim 1 comprising a flexible tab on the base plate which has been bent into a recess in the hub for preventing relative rotation between the hub and the base plate.

3. An assembly according to claim 1 comprising a generally radial spring loaded pin arranged in the hub and extending into the plate for preventing relative rotation between the hub and the base plate, the pin being capable of being pressed back into the hub for allowing such rotation.

References Cited

UNITED STATES PATENTS 3,007,560  11/1961  Weir _____ 192—115 XR
3,396,909  8/1968  Seifert _____ 230—271

BENJAMIN W. WYCHE III, Primary Examiner

U.S. Cl. X.R.
192—70.16, 82, 110